(12) United States Patent
Golunski et al.

(10) Patent No.: US 7,485,271 B2
(45) Date of Patent: Feb. 3, 2009

(54) CATALYST STRUCTURE FOR TREATING $NO_X$ CONTAINING EXHAUST GAS FROM A LEAN BURN ENGINE

(75) Inventors: Stanislaw Edmund Golunski, Reading (GB); Valerie Marie Renee Houel, Reading (GB); Andrea Hawkings, Reading (GB); David William James, Reading (GB); Stephen David Pollington, Tyne & Wear (GB); Stephen Poulston, Reading (GB); Raj Rao Rajaram, Slough (GB)

(73) Assignee: Johnson Matthey Public Limited Company, London (GB)

( * ) Notice: Subject to any disclaimer, the term of this patent is extended or adjusted under 35 U.S.C. 154(b) by 254 days.

(21) Appl. No.: 10/567,795

(22) PCT Filed: Aug. 9, 2004

(86) PCT No.: PCT/GB2004/003470

§ 371 (c)(1),
(2), (4) Date: Aug. 21, 2006

(87) PCT Pub. No.: WO2005/016496

PCT Pub. Date: Feb. 24, 2005

(65) Prior Publication Data

US 2007/0059223 A1 Mar. 15, 2007

(30) Foreign Application Priority Data

Aug. 9, 2003 (GB) .............................. 0318776.2

(51) Int. Cl.
*B01D 53/56* (2006.01)
*B01D 53/94* (2006.01)
*F01N 3/10* (2006.01)

(52) U.S. Cl. .............. 423/213.2; 423/213.5; 423/213.7; 423/239.1; 423/239.2; 422/168; 422/169; 422/170; 422/177; 422/180; 60/274; 60/282; 60/299; 60/302

(58) Field of Classification Search .............. 423/213.2, 423/213.5, 213.7, 239.1, 239.2; 422/168, 422/169, 170, 177, 180; 502/344, 325, 304, 502/324, 302; 60/274, 282, 299, 302
See application file for complete search history.

(56) References Cited

U.S. PATENT DOCUMENTS

| 3,857,921 | A | | 12/1974 | Tamura et al. |
| 5,491,120 | A | * | 2/1996 | Voss et al. .................. 502/304 |
| 5,534,237 | A | | 7/1996 | Yoshida et al. |
| 5,586,433 | A | | 12/1996 | Boegner et al. |
| 5,593,933 | A | | 1/1997 | Chattha et al. |
| 6,199,372 | B1 | | 3/2001 | Wakamoto |
| 6,314,722 | B1 | | 11/2001 | Matros et al. |
| 6,508,057 | B1 | | 1/2003 | Bouchez et al. |
| 2001/0005988 | A1 | | 7/2001 | Russell |
| 2005/0101473 | A1 | * | 5/2005 | Marshall et al. ................ 502/60 |
| 2005/0103099 | A1 | | 5/2005 | van Nieuwstadt et al. |
| 2005/0129601 | A1 | * | 6/2005 | Li et al. ..................... 423/239.2 |
| 2006/0039843 | A1 | * | 2/2006 | Patchett et al. ........... 423/239.1 |
| 2006/0156709 | A1 | * | 7/2006 | Twigg et al. ................... 60/278 |
| 2007/0269353 | A1 | * | 11/2007 | Li et al. ....................... 422/176 |

FOREIGN PATENT DOCUMENTS

| DE | 103 31 393 A1 | 2/2005 |
| EP | 0 577 438 A2 | 1/1994 |
| EP | 0 577 438 A3 | 1/1994 |
| EP | 0 671 208 A1 | 4/1995 |
| EP | 0 658 368 A1 | 6/1995 |
| EP | 0 714 693 A1 | 6/1996 |
| EP | 0 761289 A2 | 3/1997 |
| EP | 0 761289 A3 | 3/1997 |
| EP | 0 947 235 A1 | 10/1999 |
| EP | 0 971 102 A2 | 1/2000 |
| EP | 0 971 102 A3 | 1/2000 |
| EP | 1 008 379 A1 | 6/2000 |
| EP | 1 033 161 B1 | 9/2000 |
| EP | 1 264 978 A2 | 12/2002 |
| EP | 1 264 978 A3 | 12/2002 |
| EP | 1 365 119 A2 | 11/2003 |
| EP | 1 365 119 A3 | 11/2003 |
| EP | 1 475 140 A1 | 11/2004 |
| EP | 1 553 269 A1 | 7/2005 |
| GB | 2 236 493 A | 4/1991 |
| GB | 2 238 486 A | 6/1991 |
| GB | 2 374 559 A | 10/2002 |
| JP | 2000-64827 A | 2/2000 |
| JP | 2001-113134 A | 4/2001 |

(Continued)

OTHER PUBLICATIONS

Breen et al., "An investigation of the thermal stability and sulphur tolerance of $Ag/\gamma-Al_2O_3$ catalysts for the SCR and $NO_x$ with hydrocarbons and hydrogren," *Applied Catalysis B: Environmental*, vol. 70, Issues 1-4, Jan. 31, 2007, pp. 36-44.

(Continued)

*Primary Examiner*—Timothy C Vanoy
(74) *Attorney, Agent, or Firm*—RatnerPrestia

(57) ABSTRACT

A catalyst structure for treating exhaust gas from a lean burn internal combustion engine comprises a substrate monolith comprising a lean $NO_X$ catalyst (LNC) composition associated with at least one partial oxidation catalyst (POC), wherein the LNC composition is selected from the group consisting of: (a) silver or a silver compound supported on alumina; and (b) at least one metal selected from the group consisting of copper (Cu), iron (Fe), cobalt (Co) and cerium (Ce) supported on at least one zeolite, and wherein the at least one POC is selected from the group consisting of: (i) a bulk oxide, a bulk composite oxide or a bulk mixed oxide comprising at least one metal selected from the group consisting of manganese (Mn), iron (Fe), cerium (Ce) and praseodymium (Pr); and (ii) at least one of rhodium (Rh) and palladium (Pd) disposed on at least one inorganic oxide support.

24 Claims, 10 Drawing Sheets

FOREIGN PATENT DOCUMENTS

| | | |
|---|---|---|
| JP | 2001-115825 A | 4/2001 |
| JP | 2002-370031 | 12/2002 |
| WO | WO01/56686 A1 | 8/2001 |
| WO | WO-02/16014 A1 | 2/2002 |
| WO | WO-03/031780 A1 | 4/2003 |
| WO | WO-2004/022229 A1 | 3/2004 |
| WO | WO-2007/007107 A1 | 1/2007 |
| WO | WO-2007/054740 A1 | 5/2007 |

OTHER PUBLICATIONS

Hickey et al., "Improvement of $SO_x$-Resistance of Silver Lean-$DeNO_x$ Catalysts by Supporting on $CeO_2$-Containing Zirconia," *Journal of Catalysis*, vol. 209, Issue 1, Jul. 1, 2002, pp. 271-274.

Klingstedt et al., "A highly active Ag/alumina catalytic converter for continuous HC-SCR during lean-burn conditions: from laboratory to full-scale vehicle tests," *Topics in Catalysis*, vol. 30-31, No. 1, Jul. 2004, pp. 27-30.

König et al., "Lean-burn catalysts from the perspective of a car manufacturer. Early work at Volkswagen Research," *Topics in Catalysis*, vol. 28, Nos. 1-4, Apr. 2004, pp. 99-103.

Lindfors et al., "Silver/alumina catalyst for selective catalytic reduction of $NO_x$ to $N_2$ by hydrocarbons in diesel powered vehicles," *Topics in Catalysis*, vol. 28, Nos. 1-4, Apr. 2004, pp. 185-189.

Meunier et al., "Effect of ex situ treatments with $SO_2$ on the activity of a low loading silver-alumina catalyst for the selective reduction of NO and $NO_2$ by propene," *Applied Catalysis B: Environmental*, vol. 30, Issues 1-2, Feb. 26, 2001, pp. 163-172.

Satokawa, "Enhancing the $NO/CH_3H_8/O_2$ Reaction by Using $H_2$ over $Ag/Al_2O_3$ Catalysts under Lean-Exhaust Conditions," *Chemistry Letters*, vol 29 (2000), No. 3, pp. 294-295.

Shibata et al., "Promotion of effect of hydrogen on surface steps in SCR of NO by propane over alumina-based silver catalyst as examined by transient FT-IR," *Phys. Chem. Chem. Phys.*, 2003, vol. 5, Issue 10, pp. 2154-2160.

Satokawa et al., "Promotion effect of $H_2$ on the low temperature activity of the selective reducton of NO by light hydrocarbons over $Ag/Al_2O_3$," *Applied Catalysis B: Environmental*, vol. 42, Issue 2, May 8, 2003, pp. 179-186.

Trimm et al, "Onboard Fuel Conversion for Hydrogen-Fuel-Cell-Driven Vehicles," *Catalysis Reviews*, vol. 43, Issue 1 & 2, May 2001, pp. s 31-84.

\* cited by examiner

US 7,485,271 B2

CATALYST STRUCTURE FOR TREATING NO$_x$ CONTAINING EXHAUST GAS FROM A LEAN BURN ENGINE

This application is the U.S. National Phase application of PCT International Application No. PCT/GB2004/003470, filed Aug. 9, 2004, and claims priority of British Patent Application No. 0318776.2.

FIELD OF THE INVENTION

This invention relates to a catalyst structure for treating exhaust gas of a lean burn internal combustion engine comprising a lean NO$_x$ catalyst (LNC) composition. In particular, the invention concerns a catalyst structure wherein the LNC composition is selected from the group consisting of: (a) silver or a silver compound supported on alumina; and (b) at least one metal selected from the group consisting of copper (Cu), iron (Fe), cobalt (Co) and cerium (Ce) supported on at least one zeolite.

BACKGROUND OF THE INVENTION

LNCs are sometimes also referred to in the literature as non-selective catalytic reduction (NSCR) catalysts, hydrocarbon selective catalytic reduction (HC-SCR) catalysts, lean NO$_x$ reduction catalysts, "DeNOx catalysts" and NO$_x$ occluding catalysts.

In lean NO$_x$ catalysis, hydrocarbons (HC) react with nitrogen oxides (NO$_x$), rather than oxygen (O$_2$), to form nitrogen (N$_2$), carbon dioxide (CO$_2$) and water (H$_2$O) according to reaction (1):

$$\{HC\}+NO_x \rightarrow N_2+CO_2+H_2O \quad (1)$$

The competitive, non-selective reaction with oxygen is given by reaction (2):

$$\{HC\}+O_2 \rightarrow CO_2+H_2O \quad (2)$$

A number of catalysts are known for selectively promoting the reaction (1) including platinum (Pt) on alumina (Al$_2$O$_3$), copper (Cu)-substituted zeolite such as Cu/ZSM-5 and silver (Ag) supported on Al$_2$O$_3$ (see e.g. EP 0658368).

Pt/Al$_2$O$_3$ is active in a relatively narrow temperature window at relatively low temperature (peak activity ~250° C.). Another problem is that it is relatively unselective for N$_2$ formation in that it favours the formation of N$_2$O over N$_2$ at relatively low temperatures. N$_2$O is a potent greenhouse gas (at least 200 times more potent than CO$_2$) and accordingly its release into the atmosphere is undesirable.

Zeolite-based LNCs, such as Cu/ZSM5, and Ag/Al$_2$O$_3$ LNCs have wider temperature windows of activity than Pt-based LNCs and also operate at higher temperatures (peak activity of about 400-450° C. and above).

It would be desirable to develop an exhaust system for treating exhaust gas of a lean burn internal combustion engine for selectively reducing NO$_x$ to N$_2$ in the presence of a suitable reductant over a relatively broad temperature window of activity without producing N$_2$O.

We have investigated the known silver- and zeolite-based LNC's and we have found that their low temperature activity is improved when the reductant is treated with a partial oxidation catalyst. We believe that this step produces an oxygenated hydrocarbon feedstock. Furthermore, we believe that the activity of Ag/Al$_2$O$_3$ is suppressed by coke formation, which may be one reason why it has not found wider acceptance in the industry.

A partial oxidation catalyst (POC) is a catalyst that promotes the partial oxidation of hydrocarbons in exhaust gas of a lean-burn internal combustion engine to carbon monoxide (CO), hydrogen gas (H$_2$) and partially oxygenated hydrocarbon species, as opposed to complete oxidation to H$_2$O and CO$_2$.

EP 1008379 describes a method and device for treating NO$_x$ in an internal combustion engine exhaust system comprising a POC upstream of a NO$_x$ trap, wherein hydrocarbons introduced into the exhaust system upstream of the POC are converted to CO and H$_2$ for regenerating the NO$_x$ trap.

EP 0761289 describes an exhaust gas cleaner and method for removing NO$_x$ by reduction from a lean burn internal combustion engine exhaust gas. According to the disclosure, nitrogen-containing compounds such as alkyl nitrites, ammonia etc. and aldehydes are produced on e.g. Ag/Al$_2$O$_3$ which are subsequently reduced by being brought into contact with a second catalyst of: (a) titania; (b) a titanium component supported on an inorganic oxide; (c) an inorganic oxide carrying at least one first component selected from the group consisting of copper, nickel, silver, cobalt and compounds thereof and at least one second component selected from the group consisting of titanium, zirconium and compounds thereof and a third component selected from the group consisting of alkali metal elements and rare earth elements; and (d) an inorganic oxide carrying a titanium component and at least one platinum group metal. The technique of non-selective catalytic reduction is specifically distinguished in the background to the disclosure.

SUMMARY OF THE INVENTION

We have now discovered that selective, low temperature NOx reduction can be improved by combining known silver- and/or zeolite-based LNC's with at least one partial oxidation catalyst (POC).

According to a first aspect, the invention provides a catalyst structure for treating exhaust gas from a lean burn internal combustion engine, which catalyst structure comprising a substrate monolith comprising a lean NO$_x$ catalyst (LNC) composition associated with at least one partial oxidation catalyst (POC), wherein the LNC composition is selected from the group consisting of: (a) silver or a silver compound supported on alumina; and (b) at least one metal selected from the group consisting of copper (Cu), iron (Fe), cobalt (Co) and cerium (Ce) supported on at least one zeolite, and wherein the at least one POC is selected from the group consisting of: (i) a bulk oxide, a bulk composite oxide or a bulk mixed oxide comprising at least one metal selected from the group consisting of manganese (Mn), iron (Fe), cerium (Ce) and praseodymium (Pr); and (ii) at least one of rhodium (Rh) and palladium (Pd) disposed on at least one inorganic oxide support.

It is believed that where the silver is present as a compound thereof, it is present as its oxide. In use, the silver can be present in the form of its carbonate, hydroxide or nitrate by combining with components of the exhaust gas.

According to a second aspect, the invention provides an exhaust system for a lean-burn internal combustion engine comprising a catalyst structure according to the invention.

According to a third aspect according to the invention, an apparatus comprises a lean-burn internal combustion engine including an exhaust system according to the invention.

According to a fourth aspect, the invention provides a method of selectively reducing NO$_x$ in an exhaust gas of a lean burn internal combustion engine to N$_2$, which method comprises introducing a reductant into the exhaust gas and contacting the resulting mixture with a lean $NO_x$ catalyst (LNC) composition associated with at least one partial oxidation catalyst (POC), wherein the LNC composition is selected from the group consisting of: (a) silver or a silver compound supported on alumina; and (b) at least one metal selected from the group consisting of copper (Cu), iron (Fe), cobalt (Co) and cerium (Ce) supported on at least one zeolite, and wherein the at least one POC is selected from the group consisting of: (i) a bulk oxide, a bulk composite oxide or a bulk mixed oxide comprising at least one metal selected from the group consisting of manganese (Mn), iron (Fe), cerium (Ce) and praseodymium (Pr); and (ii) at least one of rhodium (Rh) and palladium (Pd) disposed on at least one inorganic oxide support.

BRIEF DESCRIPTION OF THE DRAWINGS

In order that the invention may be more fully understood, the following Examples are provided by way of illustration only and with reference to the accompanying drawings, in which.

Figure 1:
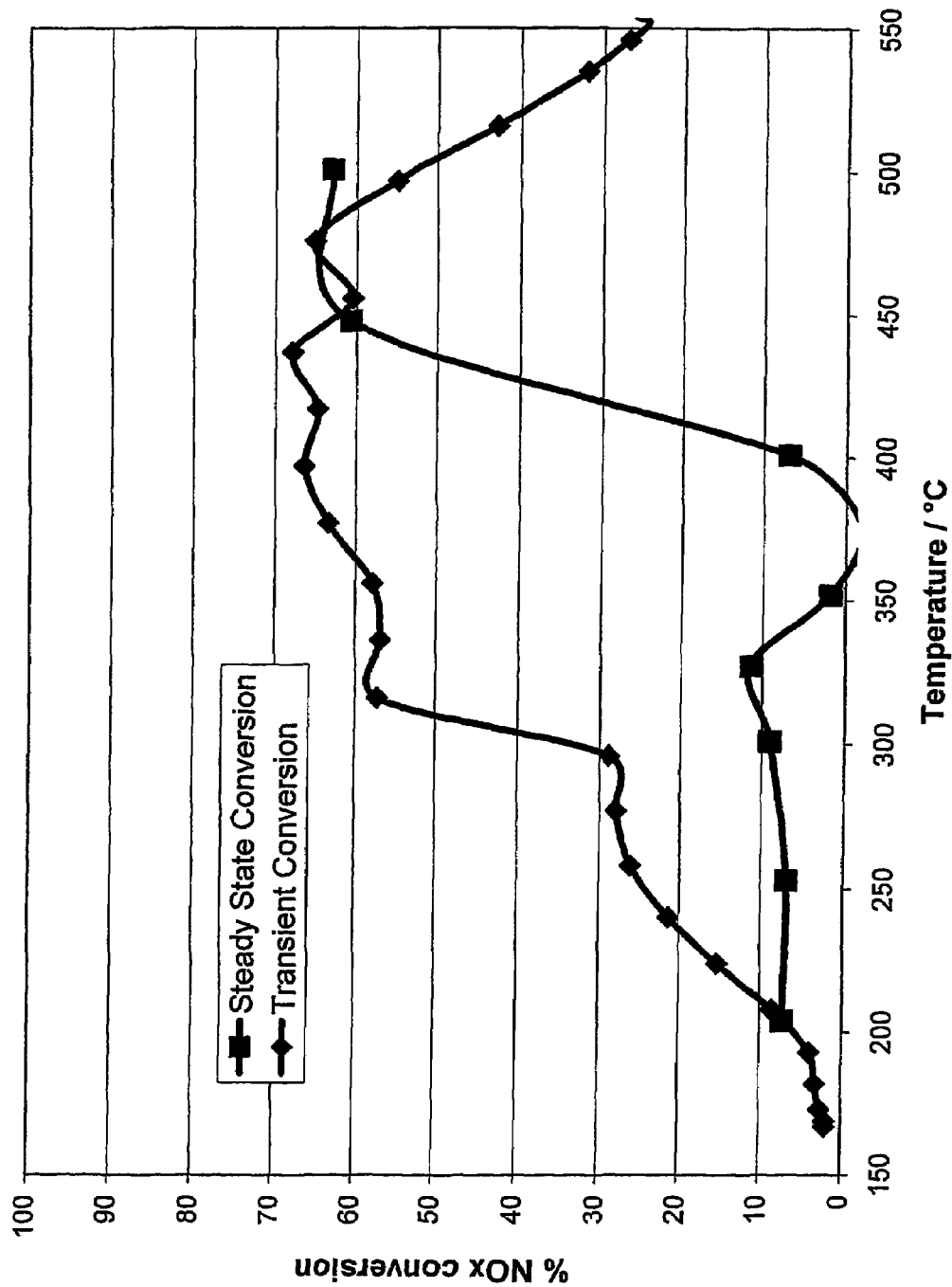
FIG. 1 is a graph comparing % $NO_x$ conversion between steady state and transient modes for Comparative Example 1 as a function of temperature.

An advantage of the present invention is that low temperature $NO_x$ conversion activity e.g. from 200-350° C. is enhanced compared with $Ag/Al_2O_3$ per se or, for example, Cu/ZSM5 per se.

A further advantage of the $Ag/Al_2O_3$ embodiment of the invention is that the arrangement reduces or prevents coke formation on the LNC during extended periods at low temperature, improving the overall activity of the LNC.

For the purposes of comparison, we have investigated the catalyst described in JP 2002370031 which contains Ag on mixed oxides (3-40 wt. % $CeO_2$ on alumina) and found it to be inactive as a LNC.

The catalyst structure of the present invention can be arranged in a number of configurations, some of which are shown in FIG. 10. The configuration can be selected according to the activity required within a desired temperature window. In one embodiment the substrate monolith comprises a physical mixture of the LNC composition and the at least one POC. In another embodiment, the substrate monolith comprises a layer of the at least one POC on a layer of the LNC composition. Alternatively, the substrate monolith comprises a layer of the LNC composition on a layer of the at least one POC.

A suitable silver loading in the LNC composition of group (a) is in the range 0.5 to 10.0 wt. % based on the total weight of the alumina Any form of alumina can be used, in the present invention, such as alpha-, delta- or theta-alumina. However, we have found that the best performance is obtained when using high surface area gamma-aluminas.

In the LNC composition, the at least one zeolite of the LNC composition can be selected from the group consisting of ZSM-5, ZSM-8, ZSM-11, ZSM-12, ZSM-20, mordenite, gamma-zeolite, beta-zeolite, silicalite, X zeolite, Y zeolite, L zeolite, erionite, USY zeolite or any mixture of two or more thereof.

The total amount of the at least one metal selected from the group consisting of Cu, Fe, Co and Ce in the LNC composition of group (b) is suitably in the range 0.5 to 10.0 wt. % based on the total weight of the zeolite.

Referring to the at least one POC, the oxides of group (i) can comprise at least one stabiliser selected from the group consisting of: zirconium (Zr), lanthanum (La), aluminium (Al), yttrium (Y), Pr and neodymium (Nd). The at least one metal can form composite oxides or mixed oxides with the stabiliser. Suitable molar ratios of the at least one metal to the at least one stabiliser (in total) is 2:98M to 90:10M, where M is the at least one metal selected from the group consisting of Mn, Fe, Ce and Pr.

"Composite oxide" as defined herein means a largely amorphous oxide material comprising oxides of at least two elements which are not true mixed oxides consisting of the at least two elements.

A preferable POC of group (i) for use in the invention consists of bulk $CeO_2$, or a mixed oxide or composite oxide of Ce and Zr.

The at least one inorganic oxide support of the POC of group (ii) can comprise an oxide of Al, Ce, Zr, titanium (Ti), silicon (Si), magnesium (Mg), chromium (Cr) or a mixture, composite oxide or mixed oxide of any two or more thereof, such as a mixed oxide or a composite oxide of Ce and Zr.

In other embodiments, the composite oxide or mixed oxide comprises a zeolite, a non-zeolite silica-alumina, a silica-zirconia, an alumina-zirconia, an alumina-chromia, an alumina-ceria or a ceria-titania.

A suitable total loading of the Rh and/or Pd in the at least one POC of group (ii) is in the range 0.5 to 10.0 wt. % of Rh and/or Pd, based on the total weight of the at least one support.

The or each POC oxide of group (i) and/or the or each POC support of group (ii) can be doped with at least one of lanthanum (La), barium (Ba), Ce, tungsten (W), Si and Mn to improve the stability of the support to high temperature ageing, act as a lean $NO_x$ promoter and/or improve the oxygen storage capacity of the system, the latter particularly in the case of manganese. Tungsten is a particularly suitable dopant for improving the thermal stability of group (ii) supports such as alumina or titania.

Suitable values of dopant addition are from 0.5 to 20 wt %.

Typical weight ratios of the LNC composition to the at least one POC are in the range 20:1 to 1:5, optionally from 10:1 to 1:1.

Methods of preparing the LNC compositions according to the invention are known and include wet impregnation, ion-exchange and co-precipitation. A detailed discussion of which methods will not be made here, as the skilled person is aware of such techniques.

The catalyst structure of the present invention can be configured in a number of ways, the activity of some of which are shown in the accompanying Examples and Figures. In one embodiment, some or all of the LNC composition on the substrate monolith is located downstream of the at least one POC. In another embodiment, some or all of the LNC composition is located on a separate substrate monolith disposed downstream of the substrate monolith comprising the at least one POC.

In an alternative embodiment, some of the LNC composition on the substrate monolith is located upstream of the at least one POC. In another embodiment, some of the LNC composition is located on a separate substrate monolith disposed upstream of the substrate monolith comprising the at least one POC.

The exhaust system can comprise means for introducing a reductant into an exhaust gas upstream of the LNC composition. Embodiments of the exhaust system wherein at least one POC is upstream of the LNC composition can optionally include an additional means for introducing a reductant into an exhaust gas upstream of at least one POC. A reason for this is that in certain embodiments, e.g. wherein the POC is $CeO_2$, the POC tends to combust hydrocarbons completely at higher temperatures, hence $NO_x$ conversion is reduced on the downstream LNC composition because of lack of reductant. A second injector between the at least one POC bed and the LNC composition bed can be used to inject hydrocarbon reductant over the LNC at temperatures which are too high for partial oxidation on the upstream at least one POC. In the case of $CeO_2$, a suitable temperature for injection of hydrocarbon between the at least one POC and downstream LNC composition is above about 350° C.

Alternatively, a lower loading of $CeO_2$, or a shorter length (or thinner "stripe") of the at least one POC, can be disposed on the substrate monolith upstream of the LNC composition to increase the amount of hydrocarbon slip or breakthrough to the downstream LNC composition.

The means for introducing a reductant into an exhaust gas upstream of the LNC composition can comprise at least one of: means for injecting the reductant into the exhaust gas; means for adjusting the ignition timing of at least one engine cylinder; and means for adjusting the engine air-to-fuel ratio.

Typically, a source of hydrocarbon reductant comprises the fuel that powers the engine.

The apparatus can comprise means for controlling the or each reductant introducing means. In one embodiment, the control means is arranged, when in use, to introduce the reductant into the exhaust gas when the POC is from between 200-350° C. in temperature, such as in the case where the POC is $CeO_2$ and is located upstream of the LNC composition. This arrangement can reduce or prevent complete combustion of hydrocarbon upstream of the LNC composition, to the detriment of higher temperature $NO_x$ reduction.

Generally, the control means can be arranged, when in use, to introduce the reductant into the exhaust gas when the LNC composition is above 200° C. in temperature.

Typically, the control means can include a pre-programmed electronic control unit incorporating a processor and can form part of the engine control unit, for example. The exhaust system can include sensor means for inputting signals, such as bed temperature, tailpipe $NO_x$ composition and $NO_x$ content of the inlet gas, in order to regulate hydrocarbon injection, with the overall effect being to maintain a desired $NO_x$ conversion in the system.

The engine of the apparatus according to the invention is typically a diesel engine, optionally a heavy-duty diesel engine, but it can be any engine producing lambda>1 exhaust gas e.g. a lean-burn gasoline engine or an engine powered by compressed natural gas (CNG) or liquid petroleum gas (LPG).

A suitable substrate monolith for use in the present invention can be a flow-through monolith of metal or ceramic construction. Where ceramic, the substrate can be cordierite or silicon carbide, for example. Alternatively, the catalyst structure can include a filter substrate such as a wall-flow filter.

If desired, the catalyst structure of the present invention can be combined with one or more additional LNCs to yield an exhaust system with yet further improved activity across a desired temperature window. In practical applications it may be desirable to include an oxidation catalyst to remove excess reductant which slips the LNC composition.

Figure 10A:
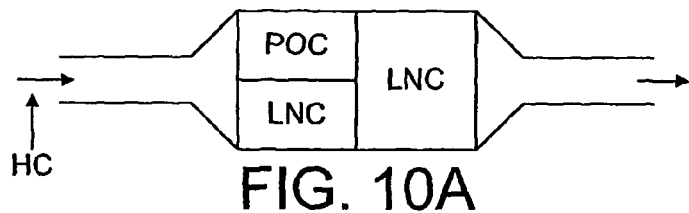
FIG. 10A is a schematic diagram of an exhaust system comprising a catalyst structure according to the present invention wherein a ceramic flow-through substrate monolith comprises an upstream end zone including an upper layer of POC and an under layer of LNC and a downstream end zone including an LNC.

Referring to FIG. 10, FIG. 10A is a schematic diagram representing an exhaust line including a can comprising a catalyst structure according to the invention comprising a ceramic flow-through substrate monolith disposed between two diffusers. "HC" represents a schematic injection point for hydrocarbon reductant. The upstream end zone (as shown by the direction of flow arrows) of the substrate monolith comprises an upper layer of a POC (such as bulk $CeO_2$) and an underlayer of LNC composition, such as $Ag/Al_2O_3$.

Figure 10B:
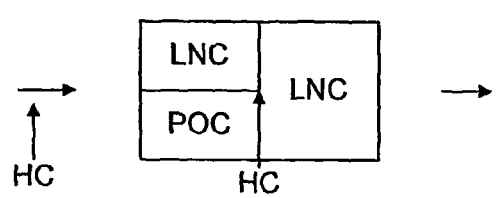
FIG. 10B is a schematic diagram of an exhaust system comprising a catalyst structure according to the present invention wherein a ceramic flow-through substrate monolith comprises an upstream end zone including an upper layer of LNC and an under layer of POC and a downstream end zone including an LNC.

In an alternative configuration of the FIG. 10A embodiment shown in FIG. 10B, the underlayer in the upstream zone is the POC, whereas the overlayer is the LNC.

Figure 10C:
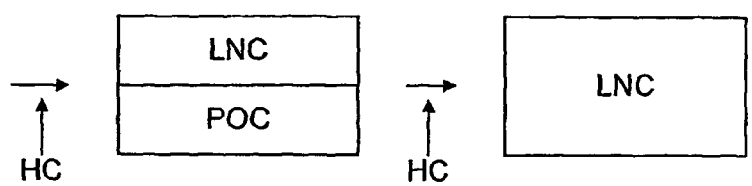
FIG. 10C is a schematic diagram of an exhaust system comprising a catalyst structure according to the present invention wherein a first ceramic flow-through substrate monolith comprises an upper layer of LNC and an under layer of POC and a second substrate monolith located downstream comprises an LNC.

FIG. 10C shows a further alternative to the arrangement shown in FIG. 10A, wherein the POC is disposed in an overlayer on the LNC on a first substrate monolith and a second substrate monolith coated with LNC is disposed downstream. An additional injector is disposed between the first and second substrate monoliths and a control means (not shown) is arranged to inject hydrocarbon between the two substrate monoliths e.g. continuously when the downstream LNC is above e.g. 200° C. (when a $Ag/Al_2O_3$ or Cu/ZSM5 catalyst is used) and to inject hydrocarbon upstream of the upstream substrate monolith at, for example, 200-350° C. in the case of $CeO_2$ or Ce-containing mixed- or composite-oxides. This arrangement enables hydrocarbon to contact the downstream LNC at higher temperatures in order to promote $NO_x$ reduction, which hydrocarbon would otherwise be combusted on the upstream POC if the exhaust system comprised only an hydrocarbon injector upstream of the POC. Optionally, the FIG. 10C arrangement can also include an additional injector between the upstream and downstream zones for similar reasons. The first and second substrate monoliths of FIG. 10C can be inserted into the same can or separate cans in the exhaust line.

Figure 10D:
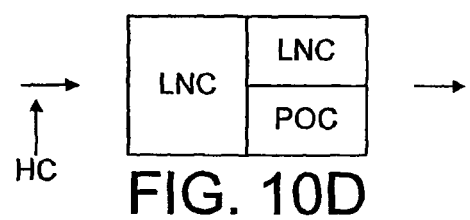
FIG. 10D is a schematic diagram of an exhaust system comprising a catalyst structure according to the present invention wherein a ceramic flow-through substrate monolith comprises an upstream end zone including an LNC and a downstream end zone including an upper layer of POC and an under layer of LNC.
Figure 10E:
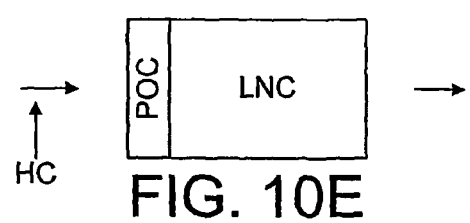
FIG. 10E is a schematic diagram of an exhaust system comprising a catalyst structure according to the present invention wherein a ceramic flow-through substrate monolith comprises an upstream end zone including a short zone of POC and a downstream end zone including an LNC.

Alternatively, the LNC can be disposed in a zone on the front (upstream) end of the substrate monolith, and the LNC can be arranged in an overlayer on the POC as shown in FIG. 10D.

The length of the zones in each of the embodiments represented in FIG. 10 can be selected according to the desired activity of the zones, the active catalyst used e.g. to enable thrifting of catalyst etc. In the arrangement shown in FIG. 10E, for example, a short zone or "stripe" of POC is used on the upstream end to limit or "trim" HC combustion in the catalyst structure at higher temperature.

Figure 10F:
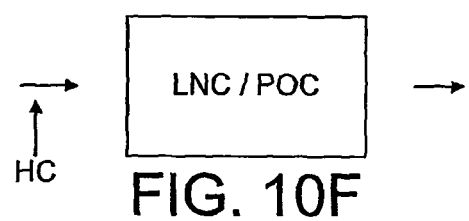
FIG. 10F is a schematic diagram of an exhaust system comprising a catalyst structure according to the present invention wherein a ceramic flow-through substrate monolith comprises LNC and POC coated on the catalyst substrate as a physical mixture or the entire length of the substrate monolith includes an upper layer of POC and an under layer of LNC or vice versa.

The FIG. 10F embodiment shows an arrangement wherein the LNC and POC are coated on the catalyst substrate as a physical mixture or the entire length of the substrate monolith includes an overlayer of POC and an underlayer of LNC or vice versa.

EXAMPLES

COMPARATIVE EXAMPLE 1

2 wt % $Ag/Al_2O_3$ Catalyst Preparation

An impregnated Ag catalyst at 2 wt % Ag based on the weight of the $Al_2O_3$ support (referred to hereinafter as $2Ag/Al_2O_3$) was made using silver nitrate by a wet impregnation method. The silver nitrate was dissolved in the appropriate amount of water measured from the pore volume of an $Al_2O_3$ support. The solution was then added to the $Al_2O_3$ with mixing. After drying overnight, the sample was calcined in air at 500° C. for 2 hours. The resulting catalyst was pelleted and particles in the size range 250<d<355 μm were selected.

COMPARATIVE EXAMPLE 2

Mixed 4:1 2 wt % $Ag/Al_2O_3$:cordierite Catalyst Preparation

The pelleted catalyst particles in the size range 250<d<355 μm prepared according to Comparative Example 1 were physically mixed with pelleted particles of cordierite of the same size in a weight ratio of 4:1 $2Ag/Al_2O_3$:cordierite.

Example 1

4:1 2 wt % $Ag/Al_2O_3$:$CeO_2$ Catalyst Preparation

The pelleted catalyst particles in the size range 250<d<355 μm prepared according to Comparative Example 1 were physically mixed with pelleted particles of bulk ceria of the same size in a weight ratio of 4:1 $2Ag/Al_2O_3$:ceria.

Example 2

Coated Substrate Including 2 wt % $Ag/Al_2O_3$

Three cores from ceramic flow-through monolith substrates were prepared, each 2.54 cm (1 inch) in diameter and 7.62 cm (3 inches) in length. A first core was coated with a washcoat containing the powder form of the catalyst of Comparative Example 1. The $Ag/Al_2O_3$ loading was 2.5 g per cubic inch (152.6 g per liter). A second core was coated with a first layer of $CeO_2$ powder and a second layer (overlayer) of the catalyst of Comparative Example 1 at the same loading as the first core. The catalyst loading of the $2Ag/Al_2O_3$:$CeO_2$ was 4:1. In the third core, one end of the core was coated with a first layer of the same amount of $CeO_2$ powder as the second core to a depth of 2.54 cm (one inch), and a second layer (overlayer) of the catalyst of Comparative Example 1 at the same loading as the first core. The catalyst loading of $2Ag/Al_2O_3$:$CeO_2$ on the whole of the third core was 4:1.

Example 3

Coated Substrate Including 5 wt % Cu/ZSM5

Example 2 was repeated except in that a 5 wt % Cu/ZSM5 catalyst prepared by wet impregnation was used instead of the powdered $2Ag/Al_2O_3$ catalyst.

COMPARATIVE EXAMPLE 3

Coated Substrate Including Catalyst of JP 2002370031

A ceramic flow-through monolith substrate core 2.54 cm (1 inch) in diameter and 7.62 cm (3 inches) in length was coated with alumina powder at a loading of 2.5 g per cubic inch (152.6 g per liter) and the coated core was dried. The washcoated alumina was then impregnated with a mixture of silver and cerium salts to achieve a final catalyst loading of 2 wt % silver and 10 wt % cerium, and the resulting piece was dried and calcined. As far as this patent publication can be understood, the above arrangement falls within its teaching.

Example 4

Activity Measurements

The activity of the pelleted catalysts to reduce NO to $N_2$ using MK1 (diesel fuel) as the reductant was measured in a simulated catalyst activity test (SCAT) gas rig species. The simulated exhaust gas composition used in the test was as follows: NO 500 ppm, C1 2250 ppm (MK1 diesel fuel), CO 200 ppm, $O_2$ 9%, $H_2O$ 4.5%, $CO_2$ 4.5%, $N_2$ balance (C1:$NO_x$ 4.5:1). The data was collected in one of two modes:

(i) steady state conditions with 15 minutes dwell at each temperature, (data points collected at the end of 15 minutes); or (ii) transient ramp up at 10° C. per minute temperature from 200° C. to 500° C.

The coated cores were tested only under steady state conditions (data collection as above) in the following simulated exhaust gas composition: NO 500 ppm, C1 2250 ppm (US06 diesel fuel), CO 200 ppm, $O_2$ 8%, $H_2O$ 4.5%, $CO_2$ 4.5%, $N_2$ balance (C1:$NO_x$ 4.5:1).

COMPARATIVE EXAMPLE 4

Results of Activity Measurements on Catalyst of Comparative Example 1

FIG. 1 shows a graph comparing % $NO_x$ conversion between steady state and transient modes for the catalyst of Comparative Example 1 as a function of temperature. It can be seen that the sample is very active for $NO_x$ conversion between 300° C. and 550° C. (~60% conversion) in the transient mode, but it is severely deactivated in the steady state mode compared with the transient mode. We believe that this deactivation is caused by carbon species ("coke") deposited on the catalyst surface after exposure to the gas mixture for long periods at low temperature. Such conditions can be encountered in the exhaust of a diesel engine. Reasons for the above conclusion include our finding that catalyst deactivation is less severe at a C1:$NO_x$ ratio of 3:1 and activity is restored by heating the deactivated catalyst in the reaction mixture at 550° C. (results not shown).

Example 5

Results of Activity Measurements on Catalyst of Example 1

Figure 2:
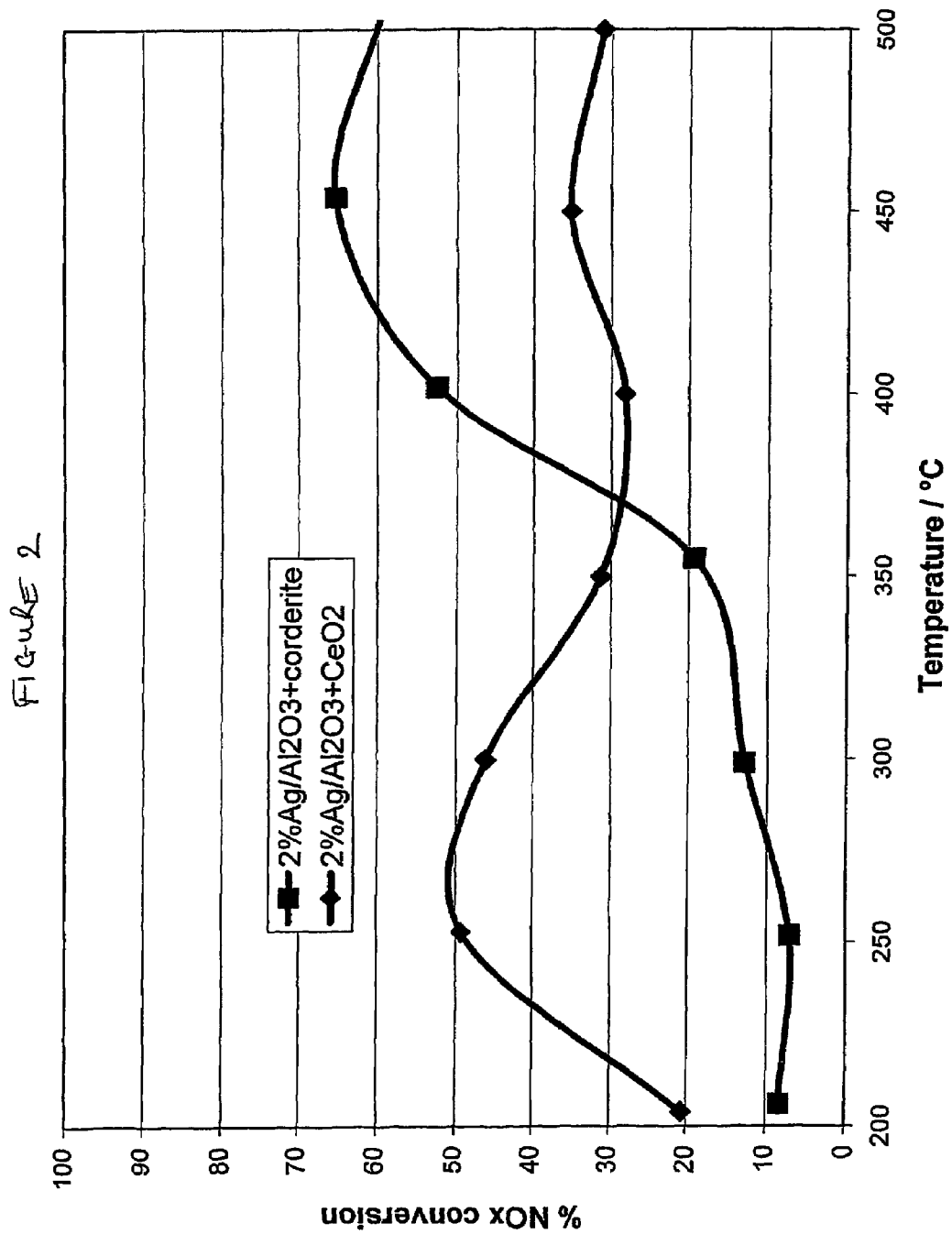
FIG. 2 is a graph showing % $NO_x$ conversion over the Catalyst of Example 1 compared with the Catalyst of Comparative Example 2 in the steady state mode as a function of temperature.

FIG. 2 shows the % $NO_x$ conversion activity over the 2Ag/$Al_2O_3$—$CeO_2$ catalyst of Example 1 compared with the 2Ag/$Al_2O_3$ catalyst of Comparative Example 2 in the steady state mode as a function of temperature. The results show that the addition of particulate $CeO_2$ to the 2Ag/$Al_2O_3$ catalyst greatly enhances its activity between 200° C.-350° C. We believe that this results from generation of partial oxidation products from the MK1 hydrocarbon in the low temperature region which promote $NO_x$ reduction on the 2Ag/$Al_2O_3$ LNC. The control sample mixed with cordierite has no significant activity in this temperature region. Higher temperature activity is lower with the 2Ag/$Al_2O_3$—$CeO_2$ mixture due to the non-selective HC oxidation over the $CeO_2$, but this is dependent on the configuration of the catalyst structure as shown in Example 9 and FIG. 8.

Figure 3:
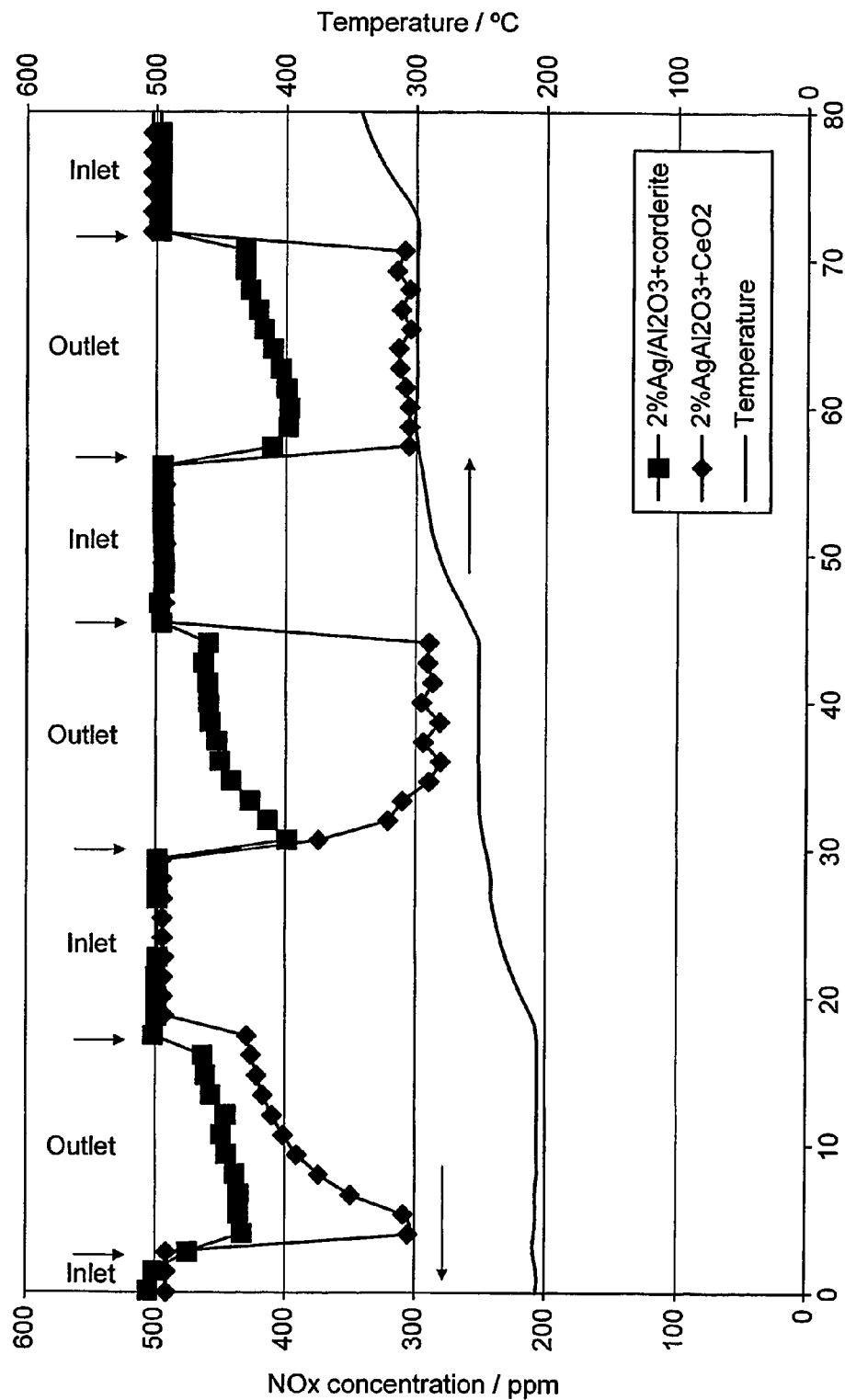
FIG. 3 is a graph showing the outlet $NO_x$ concentration as a function of time at 200° C., 250° C. and 300° C. over 2% $Ag/Al_2O_3$ and the $2Ag/Al_2O_3$—$CeO_2$ mixture in the steady mode.

FIG. 3 shows the outlet $NO_x$ concentration (ppm) as a function of time at 200° C., 250° C. and 300° C. over a 2Ag/$Al_2O_3$ catalyst of Comparative Example 1 and the 2Ag/$Al_2O_3$—$CeO_2$ catalyst of Example 1 in the steady mode. The detectors were switched to measure inlet $NO_x$ concentration during periods of temperature adjustment. The 2Ag/$Al_2O_3$—$CeO_2$ catalyst shows substantially no decay in activity during the 15 minute steady state data collection period at 250° C. and 300° C. compared with the 2Ag/$Al_2O_3$ catalyst. We believe that this is due to a combination of: the absence of any coke deposition on the 2Ag/$Al_2O_3$—$CeO_2$ catalyst; and the feed stock containing reformed i.e. partially oxidised MK1 hydrocarbon products that are particularly effective for promoting $NO_x$ reduction. It can be seen that at 200° C., $NO_x$ conversion tails off over the 2Ag/$Al_2O_3$ catalyst, possibly as a result of coking of the catalyst.

Example 6

Results of Activity Measurements: Steady State Ramp-Up and Ramp-Down on Catalyst of Example 1

Figure 4:
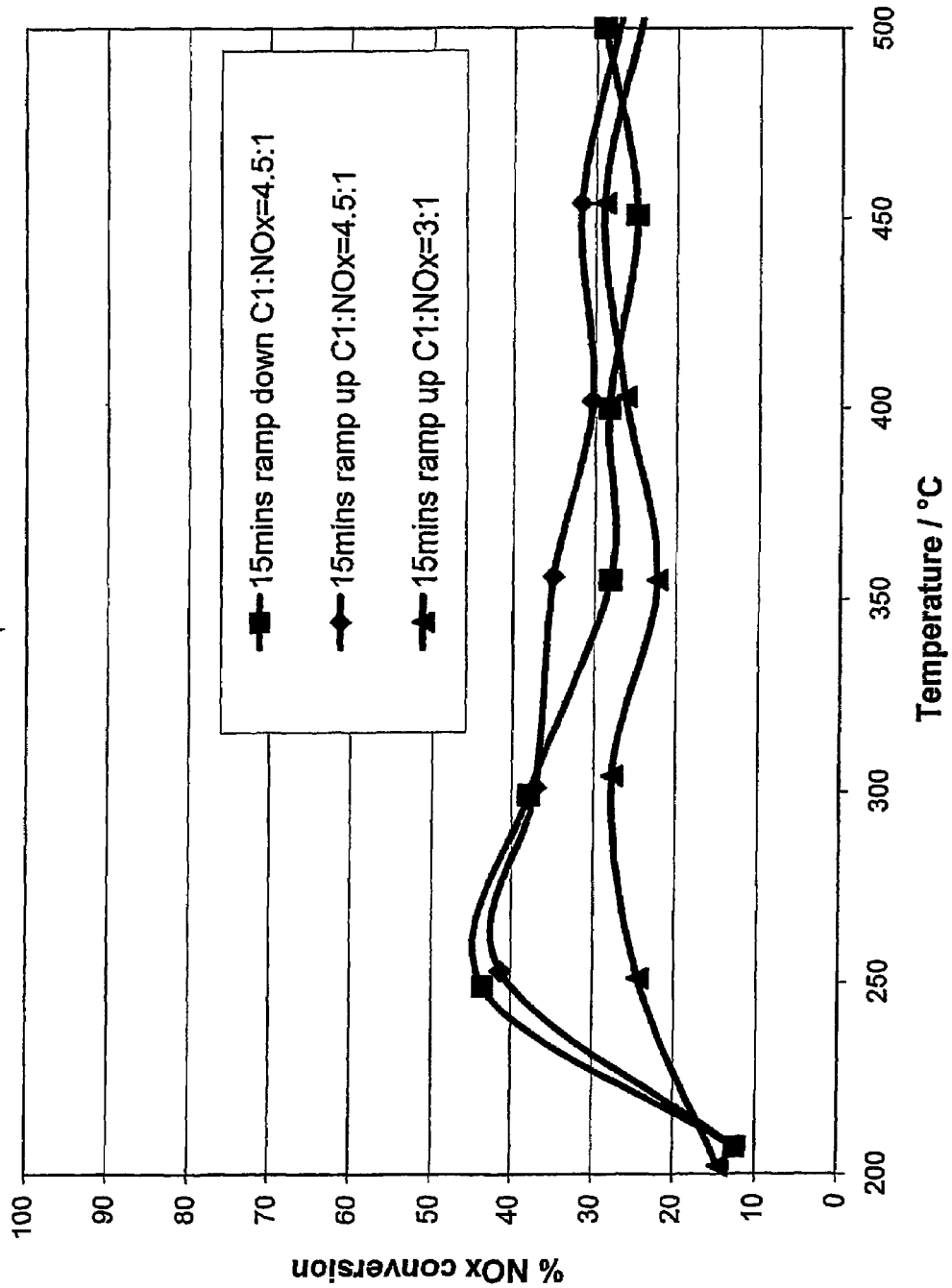
FIG. 4 is a graph showing the effect of ramp down (steady state 15 minutes) and ramp up (steady state 15 minutes) on $NO_x$ conversion of $2Ag/Al_2O_3$—$CeO_2$ (4:1)
Figure 5:
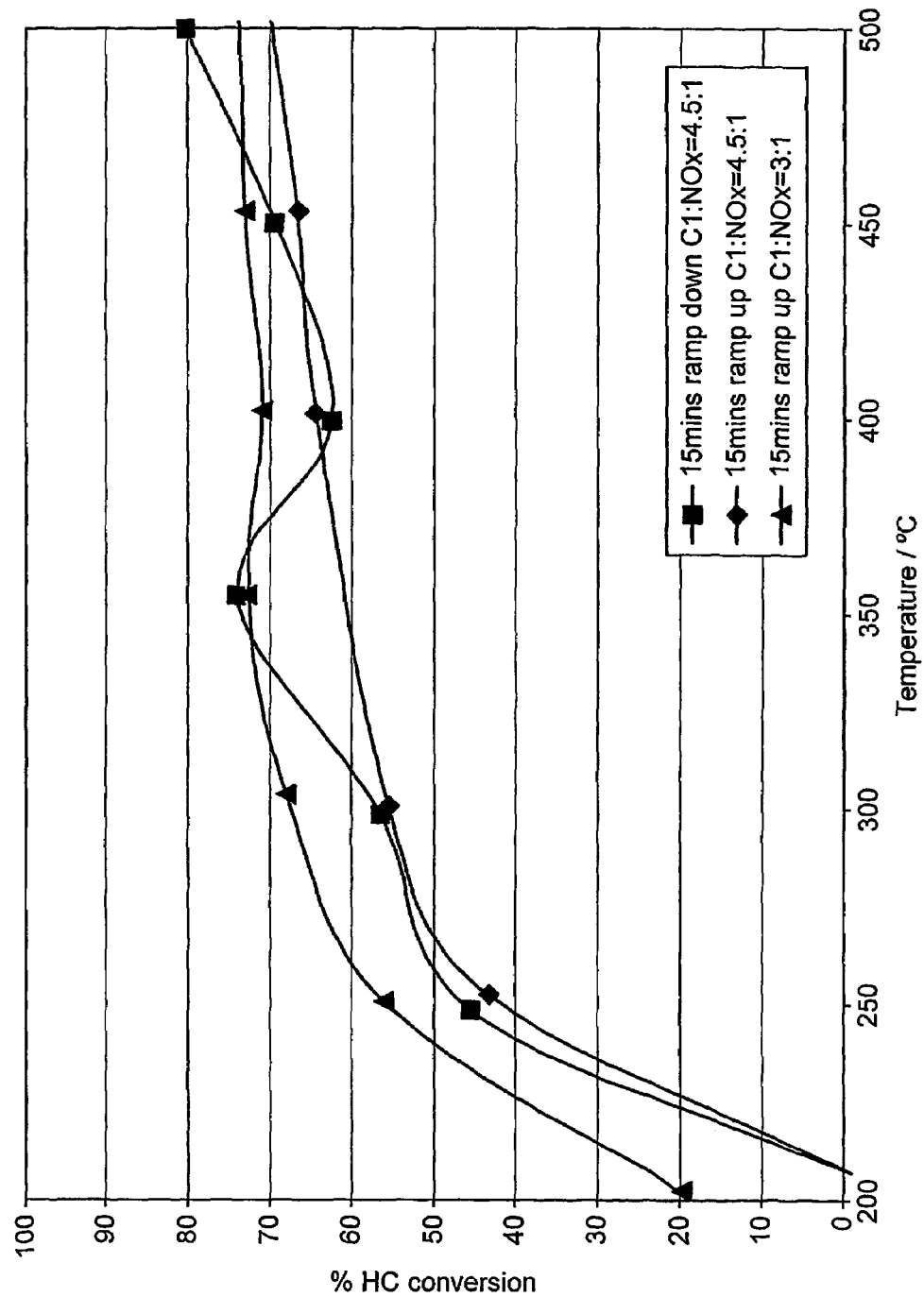
FIG. 5 is a graph shown the effect of ramp down (steady state 15 minutes) and ramp up (steady state 15 minutes) on HC conversion of 2Ag/Al2O3-CeO2 (4:1)

The activity of the 2Ag/$Al_2O_3$—$CeO_2$ catalyst under steady state conditions from 500° C. to 200° C. and then from 200° C. to 500° C. (C1:$NO_x$=4.5:1) was measured and the results are shown in FIGS. 4 and 5 respectively, following the procedure illustrated in FIG. 3. The $NO_x$ and HC conversion are similar between ramp down and ramp up and no catalyst deactivation was observed. The effect of lowering the C1:$NO_x$ ratio to 3:1 is also shown. In contrast to previous results with 2Ag/$Al_2O_3$ alone, the $NO_x$ conversion is lower at low temperature at a C1:$NO_x$ ratio of 3:1. The results are summarised in Table 1.

TABLE 1

Effect of $CeO_2$ addition on 2Ag/$Al_2O_3$ lean $NO_x$ activity.

| Catalyst | NOx conversion | | | HC conversion | | |
|---|---|---|---|---|---|---|
| | 200° C. | 250° C. | 300° C. | 200° C. | 250° C. | 300° C. |
| 2Ag/$Al_2O_3$ + cordierite | 8 | 7 | 13 | — | — | — |
| 2Ag/$Al_2O_3$—$CeO_2$ | 12 | 41 | 37 | 1 | 43 | 56 |
| 2Ag/$Al_2O_3$—$CeO_2$* | 14 | 24 | 28 | 19 | 56 | 68 |

*C1:NOx = 3:1

Example 7

Catalyst Ageing

Figure 6:
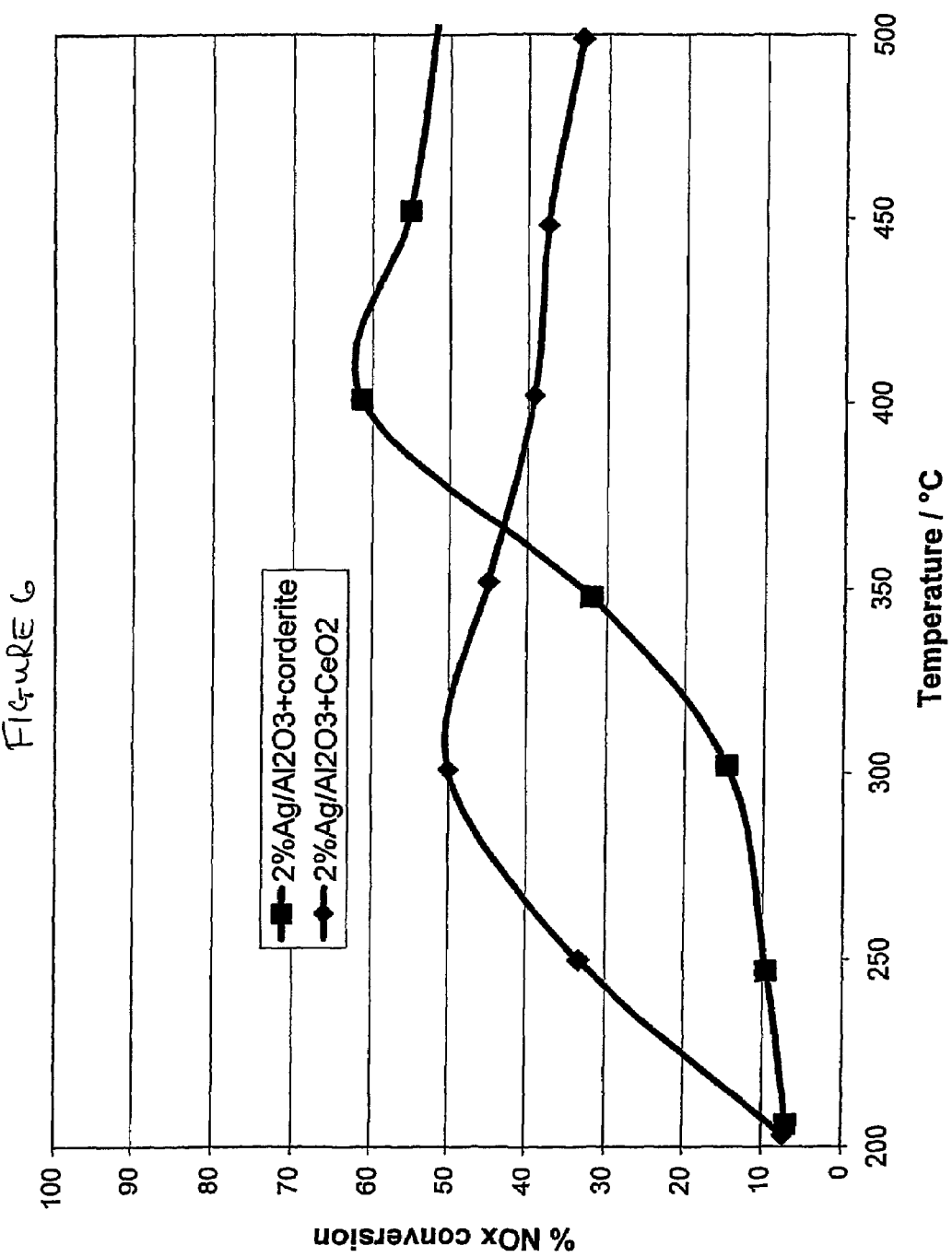
FIG. 6 is a graph comparing the effect of ageing on Comparative Example 1 and Example 1 catalysts on $NO_x$ conversion.

The 2Ag/$Al_2O_3$ and 2Ag/$Al_2O_3$—$CeO_2$ catalysts were lean hydrothermally aged in a 10% $H_2O$ and air mixture at 700° C. for 16 hours and the steady state activity of the resulting catalysts are shown in FIG. 6. It can be seen that even after the high temperature ageing, the presence of $CeO_2$ is beneficial to the low temperature activity.

Example 8

Results of Activity Measurements on Catalyst Cores of Example 3

Figure 7:
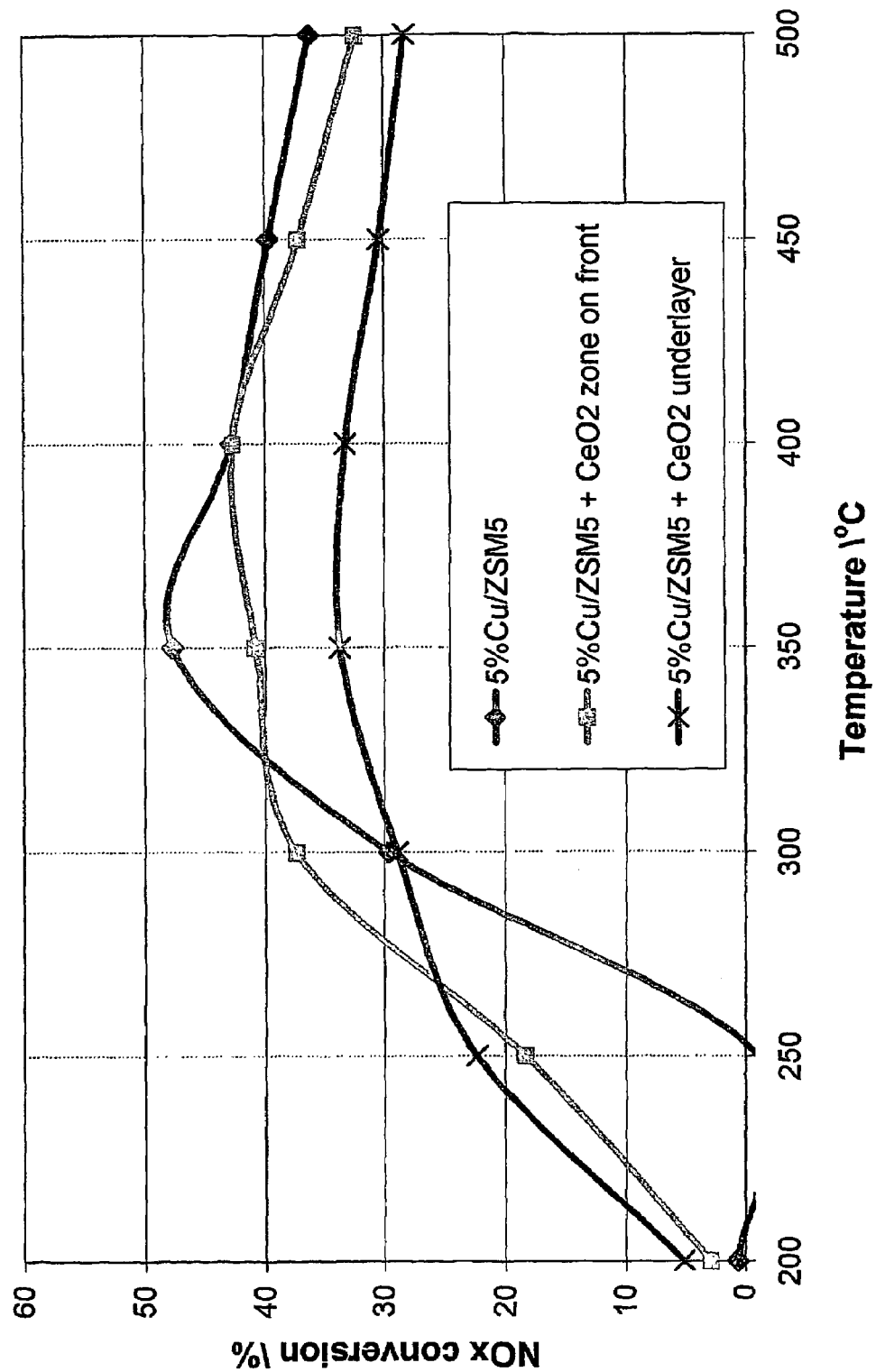
FIG. 7 is a graph showing % $NO_x$ conversion as a function of temperature for 5Cu/ZSM5 catalyst structures compared with 5Cu/ZSM5 catalyst per se.

The results of steady state analysis tests performed on the catalyst cores of Example 3, wherein the third core was oriented with the $CeO_2$ zone on the upstream side are shown in FIG. 7. It can be seen that low temperature $NO_x$ conversion in the 5Cu/ZSM5 core is improved for the catalyst structures containing $CeO_2$ relative to 5Cu/ZSM5 per se. We believe that this results from the supply of partially oxidised US06 hydrocarbon products to the LNC at low temperature.

Example 9

Results of Activity Measurements on Catalyst Cores of Example 3

Figure 8:
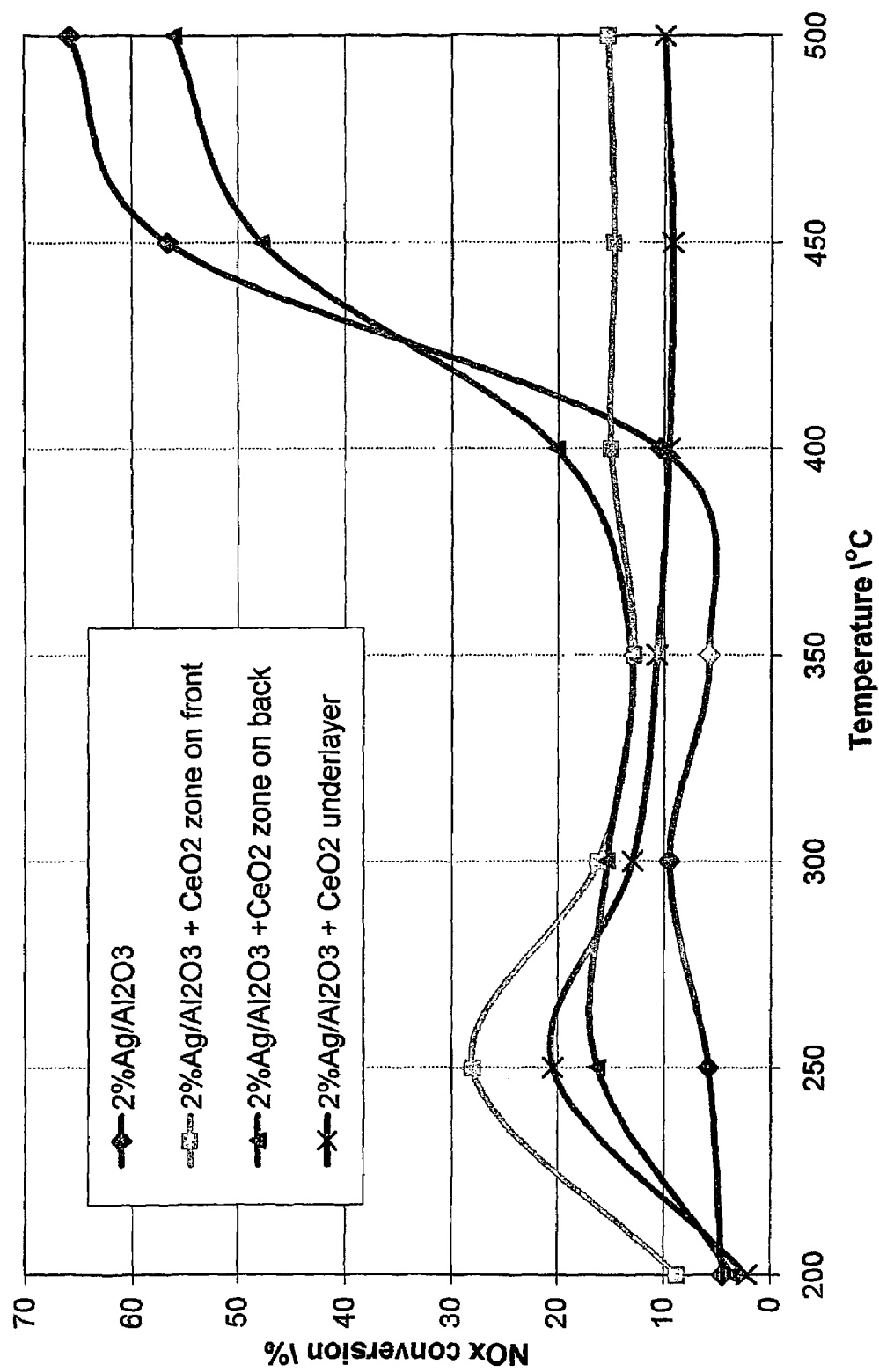
FIG. 8 is a graph shown % $NO_x$ conversion as a function of temperature for $2Ag/Al_2O_3$ catalyst structures compared with $2Ag/Al_2O_3$ catalyst per se.

The results of steady state analysis tests performed on the catalyst cores of Example 2 are shown in FIG. 7. Two configurations of the third core were tested: the $CeO_2$ zone of the upstream end; and the $CeO_2$ zone of the downstream end. It can be seen, as illustrated in FIG. 8, that low temperature $NO_x$ conversion in the $2Ag/Al_2O_3$ core is improved for the catalyst structures containing $CeO_2$ relative to $2Ag/Al_2O_3$ per Se. We believe that this results from a combination of partial oxidation products in the feedstock contacting the LNC and reduced coking of the LNC. Higher temperature $NO_x$ conversion is suppressed in the configurations wherein the $CeO_2$ is present in the upstream zone of the core relative to $2Ag/Al_2O_3$ per Se, because the $CeO_2$ favours complete combustion of the hydrocarbon instead of partial oxidation at higher temperatures. However, this can be retained with improved low temperature $NO_x$ conversion relative to 2Ag/Al2O3 per se when the mixed $2Ag/Al_2O_3$—$CeO_2$ zone is on the downstream end of the core with $2Ag/Al_2O_3$ per se on the upstream end zone.

Comparative Example 4

Results of Activity Measurements on Catalyst of Comparative Example 3

Figure 9:
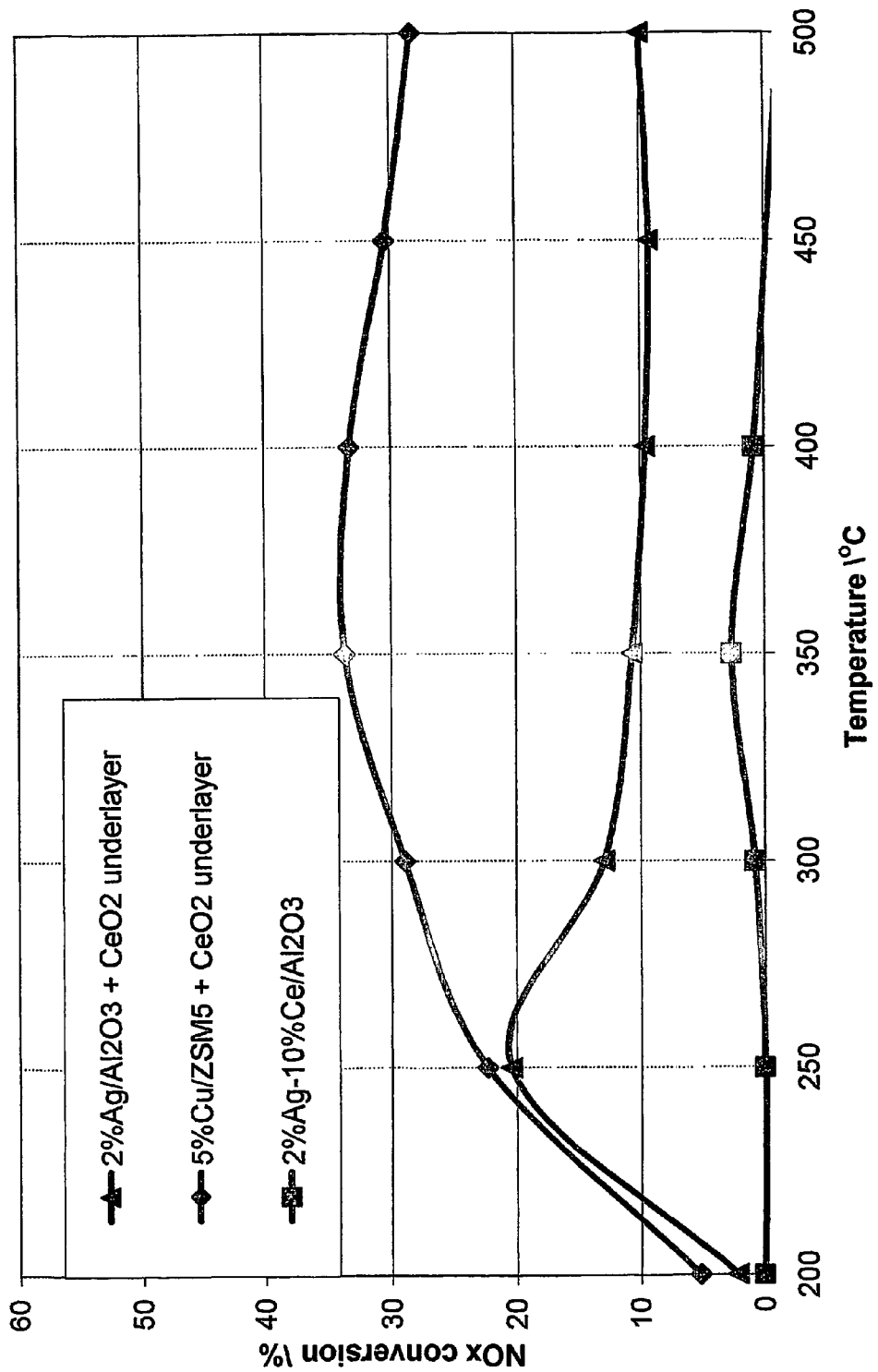
FIG. 9 is a graph shown % $NO_x$ conversion as a function of temperature for a catalyst according to JP 2002370031 compared with $2Ag/Al_2O_3$ and 5Cu/ZSM5 catalyst structures according to the invention.

The activity of the catalyst of JP 2002370031 tested under steady state conditions is shown in FIG. 9, compared to the activity of comparable catalyst arrangements of the 5Cu/ZSM5 and $2Ag/Al_2O_3$ embodiments according to the invention.

The invention claimed is:

1. An exhaust system for a lean-burn internal combustion engine comprising a catalyst structure, which catalyst structure comprises a substrate monolith comprising a lean $NO_x$ catalyst (LNC) composition associated with at least one partial oxidation catalyst (POC) and means for introducing a reductant into an exhaust gas upstream of the LNC composition, wherein the LNC composition is selected from the group consisting of: (a) silver or a silver compound supported on alumina; and (b) at least one metal selected from the group consisting of copper (Cu), iron (Fe), cobalt (Co) and cerium (Ce) supported on at least one zeolite, and wherein the at least one POC is a bulk oxide, a bulk composite oxide or a bulk mixed oxide comprising at least one metal selected from the group consisting of manganese (Mn), iron (Fe), cerium (Ce) and praseodymium (Pr).

2. An exhaust system according to claim 1, wherein the substrate monolith comprises a physical mixture of the LNC composition and the at least one POC, a layer of the at least one POC on a layer of the LNC composition or a layer of the LNC composition on a layer of the at least one POC.

3. An exhaust system according to claim 1, wherein the silver in the LNC composition of group (a) or the total amount of the at least one metal selected from the group consisting of Cu, Fe, Co, and Ce in the LNC composition of group (b) is present in the range 0.5 to 10.0 wt % based on the total weight of the alumina or zeolite support.

4. An exhaust system according to claim 1, wherein the at least one POC comprises at least one stabiliser selected from the group consisting of: zirconium (Zr), lanthanum (La), alumina (Al), yttrium (Y), Pr and neodymium (Nd).

5. An exhaust system according to claim 4, wherein the at least one stabiliser is present in the molar ratio 2:98M to 90:10M, where M is the at least one metal selected from the group consisting of Mn, Fe, Ce and Pr.

6. An exhaust system according to claim 1, wherein the at least one POC consists of bulk $CeO_2$ or a mixed oxide or composite oxide of Ce and Zr.

7. An exhaust system according to claim 1, wherein the weight ratio of the LNC composition to the at least one POC is from 20:1 to 1:5.

8. An exhaust system according to claim 1, wherein the weight ratio of the LNC composition to the at least one POC is from 10:1 to 1:1.

9. An exhaust system according to claim 1, wherein some or all of the LNC composition on the substrate monolith is located downstream of the at least one POC.

10. An exhaust system according to claim 9, comprising means for introducing a reductant into an exhaust gas upstream of the at least one POC.

11. An exhaust system according to claim 1, wherein some or all of the LNC composition on the substrate monolith is located downstream of the at least one POC on a separate substrate monolith.

12. An exhaust system according to claim 11, comprising means for introducing a reductant into an exhaust gas upstream of the at least one POC.

13. An exhaust system according to claim 1, wherein some of the LNC composition is located on a separate substrate monolith disposed upstream of the substrate monolith comprising the at least one POC.

14. An exhaust system according to claim 1, wherein some of the LNC composition is located on a separate substrate monolith disposed upstream of the substrate monolith comprising the at least one POC on a separate substrate monolith.

15. An exhaust system according to claim 1, comprising means for introducing a reductant into an exhaust gas upstream of the LNC composition.

16. An exhaust system according to claim 1, wherein the or each reductant introducing means comprises at least one of: means for injecting the reductant into exhaust gas in the exhaust system; means for adjusting the ignition timing of at least one engine cylinder; and means for adjusting the engine air-to-fuel ratio.

17. An apparatus comprising a lean-burn internal combustion engine including an exhaust system according to claim 1.

18. An apparatus according to claim 17, comprising a source of hydrocarbon reductant.

19. An apparatus according to claim 17, comprising means for controlling the or each reductant introducing means.

20. An apparatus according to claim 19, wherein the control means is arranged, when in use, to introduce the reductant into the exhaust gas when to POC is from between 200-350° C. in temperature.

21. An apparatus according to claim 19, wherein the control means is arranged, when in use, to introduce the reductant into the exhaust gas when the LNC composition is above 200° C. in temperature.

22. An apparatus according to claim 19, wherein the control means is arranged, when in use, to introduce the reductant between the POC and the LNC composition at a temperature of above 350° C.

23. An apparatus according to claim 17, wherein the engine is a diesel engine, optionally a heavy-duty diesel engine.

24. A method of selectively reducing $NO_x$ in an exhaust gas of a lean burn internal combustion engine to $N_2$, which method comprises introducing a reductant into the exhaust gas and contacting the resulting mixture with a lean $NO_x$ catalyst (LNC) composition associated with at least one partial oxidation catalyst (POC), wherein the LNC composition is selected from the group consisting of: (a) silver or a silver compound supported on alumina; and (b) at least one metal selected from the group consisting of copper (Cu), iron (Fe), cobalt (Co) and cerium (Ce) supported on at least one zeolite, and wherein the at least one POC is a bulk oxide, a bulk composite oxide or a bulk mixed oxide comprising at least one metal selected from the group consisting of manganese (Mn), iron (Fe), cerium (Ce) and praseodymium (Pr).

* * * * *

UNITED STATES PATENT AND TRADEMARK OFFICE
CERTIFICATE OF CORRECTION

PATENT NO. : 7,485,271 B2  
APPLICATION NO. : 10/567795  
DATED : February 3, 2009  
INVENTOR(S) : Stanislaw Edmund Golunski et al.

Page 1 of 1

It is certified that error appears in the above-identified patent and that said Letters Patent is hereby corrected as shown below:

On the Title of the patent, at "Item (75)," "Andrea Hawkings" should read --Andrea Hawkins--.

At column 12, line 40, claim 20 "when to POC" should read --when the POC--.

Signed and Sealed this

Twenty-fifth Day of August, 2009

David J. Kappos  
*Director of the United States Patent and Trademark Office*